United States Patent
Majka et al.

(10) Patent No.: US 7,441,717 B1
(45) Date of Patent: Oct. 28, 2008

(54) MICROMEDIA MILLING PROCESS

(75) Inventors: Donald J. Majka, Rochester, NY (US);
Allan F. Sowinski, Rochester, NY (US);
Yongcai Wang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/931,948

(22) Filed: Oct. 31, 2007

(51) Int. Cl.
*B02C 1/00* (2006.01)
*B02C 11/00* (2006.01)

(52) U.S. Cl. .............................. 241/21; 241/15; 241/20
(58) Field of Classification Search .................. 241/15, 241/20, 21
See application file for complete search history.

(56) References Cited

U.S. PATENT DOCUMENTS

| | | | |
|---|---|---|---|
| 5,522,553 | A | 6/1996 | LeClair et al. |
| 5,632,596 | A | 5/1997 | Ross |
| 5,662,279 | A | 9/1997 | Czekai et al. |
| 6,135,373 | A * | 10/2000 | Davenport ................ 241/30 |
| 6,241,472 | B1 | 6/2001 | Bosch et al. |
| 6,305,626 | B1 * | 10/2001 | Korstvedt ............... 241/259.1 |
| 6,402,065 | B1 | 6/2002 | Higgins |
| 2004/0187770 | A1 * | 9/2004 | Calabrese et al. ........... 117/200 |

* cited by examiner

*Primary Examiner*—Bena Miller
(74) *Attorney, Agent, or Firm*—Andrew J. Anderson

(57) ABSTRACT

A process for forming a dispersion of milled solid particles of a compound comprising forming a milling mixture of a liquid medium, milling media having an average particle size of less than or equal to about 300 microns, and a solid compound in a mixing vessel, and agitating the milling mixture with a mixer to contact the milling media and solid compound and to reduce the solid compound to a desired average particle size to form a dispersion of milled solid particles in the liquid medium, wherein the volume ratio of the milling media to the combined volume of the liquid media and solid compound in the milling mixture is less than 1, a rotor-stator mixer comprising rotor and stator elements separated by a rotor-stator gap of greater than the average particle size of the milling media and not greater than about 2.5 mm is employed to agitate the milling mixture in a milling chamber of the rotor-stator mixer, and the solid compound is milled to a volume-weighted average equivalent sphere diameter particle size of less than or equal to about 200 nm. In a preferred embodiment, the milling media is a polymeric resin having a mean particle size of less than 100 micrometers. The method enables significantly reduced levels of milling media and facilitates separation of the dispersion from the milling media in the milling mixture.

20 Claims, No Drawings

MICROMEDIA MILLING PROCESS

FIELD OF THE INVENTION

This invention relates to a milling process using fine milling media for obtaining small particles of a material, such as compounds useful as colorants in inkjet printing, and more specifically to a process employing a mill having a centered milling space between a rotor and a stator trough which the media and compound slurry passes during milling.

BACKGROUND OF THE INVENTION

For microfluidic processes such as inkjet printing, solid form compounds like pigmented colorants must be reduced in particle size from their original composition of preparation, which is commonly accomplished by milling using a liquid vehicle. Furthermore, the nascent fine particles must be simultaneously stabilized in the liquid medium as a colloidal dispersion by using a dispersant, such as a surfactant or a suitable polymer, to prevent aggregation and sedimentation. In order to produce especially fine particle size distributions on the nanometer size scale, micrometer scale milling media are agitated by high-speed stirring. The accelerated media collide with the compound to be milled, and the impact force results in de-aggregation or comminution. In one useful form, micromedia milling is a batch mixing process employing a high-shear impeller driven by a high-speed vertical mixer using polymeric resin beads (less than 300 micrometers diameter) to effect particle size reduction of the dispersion, which is typically comprised of solid compound, liquid vehicle, and particle stabilizer; U.S. Pat. No. 5,662,279 issued to Czekai et al., the disclosure of which is hereby fully incorporated by reference, is illustrative. Following the milling operation, the concentrated dispersion may conveniently be diluted and then separated from the milling media by filtration. The use of long-lived polymeric resin media minimizes the formation of mill attrition by-products that would contaminate dispersion. As the specific gravity of polymeric resin media is low and the resultant force from media-compound particle collisions is consequently reduced, however, a high proportion of media relative to solid compound is needed to produce desirable low average particle sizes, with narrow size distributions, at useful rates. Thus, the yield per batch of dispersion is substantially reduced relative to the total mixing vessel volume that is used in the milling process, and the separation of the liquid dispersion from the media bed is slow. If the media-to-dispersion ratio is decreased in order to charge the mixing vessel with more pigment dispersion to increase the overall batch yield, it is found that the same particle size distribution cannot be achieved in the normal period of time, if at all, so no net gain in productivity is possible. A need remains for an improved process that increases milling efficiency while simultaneously reducing milling media load, without compromise of dispersion particle size distribution.

SUMMARY OF THE INVENTION

The heretofore unmet need of more effective micromedia milling is provided by a process for forming a dispersion of milled solid particles of a compound comprising:

forming a milling mixture of a liquid medium, milling media having an average particle size of less than or equal to about 300 microns, and a solid compound in a mixing vessel, and agitating the milling mixture with a mixer to contact the milling media and solid compound and to reduce the solid compound to a desired average particle size to form a dispersion of milled solid particles in the liquid medium, wherein the volume ratio of the milling media to the combined volume of the liquid media and solid compound in the milling mixture is less than 1, a rotor-stator mixer comprising rotor and stator elements separated by a rotor-stator gap of greater than the average particle size of the milling media and not greater than about 2.5 mm is employed to agitate the milling mixture in a milling chamber of the rotor-stator mixer, and the solid compound is milled to a volume-weighted average equivalent sphere diameter particle size of less than or equal to about 200 nm.

ADVANTAGEOUS EFFECT OF THE INVENTION

The invention provides numerous advantages. It was surprisingly found that the milling of carbon black and crystalline chromatic pigmented colorants could be accomplished in the presence of greatly reduced micromedia levels by using a rotor-stator mixer configuration. Rotor-stator mixers enable milling at very high tip speeds that cannot be achieved practically with a conventional vertical high-shear mixer: if blade diameter is increased while maintaining shaft rotation speed, either the motor load becomes unsustainably high or the milling mixture experiences unacceptable heating. The volume of milling media required to process the pigment dispersion may be reduced remarkably in the process of the invention in comparison to conventional micromedia milling techniques, while still enabling a desired final dispersion particle size. The separation of the media from the milled dispersion may be greatly accelerated, and the loss of dispersion to retention in the media bed may be beneficially reduced.

DETAILED DESCRIPTION OF THE INVENTION

This invention is directed to the process of milling materials, such as pigmented colorants for inkjet printing inks, conventional printing inks, paints, electronic display color filter arrays, pharmaceutical compounds, and compounds useful in imaging elements, to obtain extremely fine particles thereof. Compounds useful in imaging elements refers to compounds that can be used in inkjet receiver elements, photographic recording or display elements, electrophotographic elements, thermal transfer elements, and the like. While this invention is described primarily in terms of its application to such compounds, it is to be understood that the invention can be applied to milling a wide variety of materials.

In accordance with the invention, a process for the formation of solid particle dispersions of compounds is disclosed including the steps of formation of a milling mixture comprised of a compound to be milled, milling media and a liquid vehicle, agitating the milling mixture with a rotor-stator mixer to contact the milling media and solid compound, and reducing the solid compound to an average particle volume diameter of less than or equal to about 200 nm, and more preferably less than or equal to about 100 nm, to form a dispersion of milled solid particles in the liquid medium.

Rotor-stator mills can conventionally be used in pregrinding steps or in final dispersion preparation, and they are normally used without grinding or milling media, relying on very high mechanical and hydraulic shear forces during expulsion of the slurry at high speed to de-aggregate or comminute the material to be dispersed. The rotor element of the rotor-stator mixers employed in the inventive process may comprise an annular disc or cylinder or cone element supported by a motor-driven shaft, which is rotated at high speed centered in close proximity to a stationary stator element comprised of a corresponding ring or cylinder or cone element concentric with the rotor element. The rotor and stator elements of the mixer may desirably have slots or other openings forming teeth as disclosed in U.S. Pat. Nos. 5,522,553; 5,632,596;

6,241,472 B1; and 6,402,065 B1, the disclosures of which are incorporated by reference herein. In one specific embodiment, each of the rotor and stator may comprise slots extending from inner circumferential surfaces thereof to outer circumferential surfaces thereof. A small separation (or gap or clearance) between the spinning rotor element and the corresponding concentric stationary stator element produces shear zones between the elements, and more particularly between slots or grooves that may be provided in or on the stator element and slots or grooves that may be provided in or on the rotor element. The space separating the rotor and stator elements constitutes the milling chamber and collisions between the milling media and the compound particles occur within this general space. In embodiments of this invention, the rotor and stator have a clearance, or rotor-stator gap distance, of not greater Man about 2.5 mm, preferably not greater than about 1.0 mm, and more preferably not greater than about 0.5 mm. In another embodiment, the rotor and stator have a gap distance of not greater than about 0.3 mm. The separation or gap must exceed the size of the media, however, to allow free passage of the milling mixture in and out of the milling chamber. As the gap is increased, the intensity of the shear zone is reduced but the flow rate of milling mixture through the milling chamber may desirably increase. If the gap becomes too large, effective milling will not occur, as the shear zone intensity is inadequate. It is appreciated that media bead agitation and compound comminution in the milling chamber result from complex interactions that may involve a variety of mechanical and fluidic forces and phenomena, potentially including fluid compression, fluid extension, fluid cavitation and so forth in addition to hydraulic shear. Suitable examples of rotor stator mixers for use in accord with the invention include Kady International (Scarborough, Me.) top entry Model Nos. 10T, 25T-75, 50T and 100T, and Charles Ross and Son Company (Hauppauge, N.Y.) Model Nos. Series 100 and 500, MegaShear Series and X-Series rotor-stator mixers. In one further embodiment of the invention, the gap setting may be effectively varied at will by the use of known mixers employing concentric cone-shaped rotor and stator elements, such as in configurations similar to an IKA Works Inc. (Wilmington, N.C.) model MK series or Chemineer Inc. Greerco Colloid Mill (Dayton, Ohio); thus the shear rate intensity of the milling zone can be varied by a separate route from tip speed, which influences fluid recirculation through the milling chamber. It is further noted that while in-line horizontal media mills comprised of rotor and stator elements decorated with pegs or discs having spacings or gaps that are greater than 2.5 mm to agitate the milling mixture are also known, the separation of the rotor core and the stator for such conventional media mills exceed the values useful in accordance with the rotor-stator mixers employed in the present invention.

The compound to be dispersed is initially suspended by an agitation means in a liquid medium or vehicle or carrier, and said composition is referred to as a slurry or a dispersion. The dispersion can optionally contain other solid or liquid ingredient additives as part of the vehicle or carrier, such as aqueous or organic co-solvents, surfactants (surface active chemical agents), wetting agents, antifoamants, defoamers, rheology modifiers, colloidal particle stabilizers or dispersants (molecular and/or polymeric dispersants), salts and ionic strength modifiers, pH modifiers (e.g., an acid or a base, or a buffer system), additional compounds to be milled, and so forth. Desirably, the dispersion is comprised of a particle-stabilizing additive such as a dispersant or a surfactant to prevent the aggregation of the fine particles formed during milling. In preferred embodiments of the inventive process, the dispersant is an amphiphilic organic polymer. The combination of the dispersion with the milling media forms the milling mixture. If the milling media and suspended pigment solids exceed a critical volume fraction of the mixture relative to the liquid vehicle, then a transition from a liquid form to a solid form will occur, preceded by substantial increases in viscosity. Increasing fluid viscosity or resistance to flow undesirably impedes the free circulation of the mixture through the milling chamber, potentially slowing the rate of milling thereby, and it requires higher power input to agitate the fluid, which will raise the mixture's temperature and increase the load on the mill's motor. The use of the low volume ratios of milling media to liquid slurry avoids this risk, which can cause the process to fail. On this basis, a desirable volume ratio of wetted milling media in the milling mixture to the combined volume of solid compound, liquid vehicle, and any other constituents comprising the dispersion, is no more than unity. It is preferred that the volume ratio is less than about 0.8 and more preferred that the volume ratio is about 0.6 or less. It is most preferred that volume ratio of wetted milling media to dispersion in the milling chamber is about 0.3 or less, as this low proportion of milling media maximizes milling batch productivity and greatly facilitates recovery of the dispersion from the media bed, while reducing the retained dispersion in the bed to very modest amounts. It is desirable to concentrate the compound to be milled in the liquid vehicle as much as possible as long as the milling process is not compromised, in order to maximize batch productivity. A concentration of at least about 15 weight percent of the compound to be milled relative to the liquid vehicle in the dispersion comprising the milling mixture is desirable. It is preferred to concentrate the compound to at least about 20 weight percent relative to the liquid media, and more preferred to use dispersion concentrations of at least about 30 weight percent compound, prior to optional dilution during separation of the dispersion from the media. Milling chamber concentrations of solid compound relative to liquid vehicle comprising the slurry of 40 weight percent or more are also contemplated, especially with crystalline, pigmented colorants as the milling compounds.

The milling mixture of dispersible compound, liquid media and milling media is prepared in a mixing vessel. The initial dispersion suspension may be formed first and the milling media may be added to form the milling mixture, or the dispersion components may be added to a pre-existing milling media bed and the milling mixture formed following agitation. It is contemplated that the milling process of the invention can be effected in one form by the immersion of a rotor-stator mixer head unit into the mixing vessel containing the milling mixture. In another variant, the milling mixture is pumped from a mixing vessel through an in-line rotor-stator mixer into the same mixing vessel or into a different receiving vessel, with as many passes through the rotor-stator mixer unit as needed to achieve the desired particle size distribution. In either circumstance, supplemental mixing or circulation of the milling mixture may be desirable to promote uniformity of the mixture and facilitate the delivery of new material to the milling chamber. The in-line rotor stator may be comprised of single or multiple stage rotor-stator with varying gap size. For example, the milling mixture recirculates through a course, fine, and polishing stage inside a multiple stage rotor-stator. Each stage introduces a higher level of mechanical and fluidic force (e.g., shear, compression, extension, and or cavitation, etc.) into the milling mixture in its milling chamber. The multiple stage rotor-stator is extremely effective in breaking down large particles from the raw stock material before introducing the milling mixture to the finer gap and higher mechanical and fluidic forces in the subsequent stages. The process can be continuous or recirculated in a closed loop system. The milling mixture can incorporate mixed media sizes during the comminution process. When a batch process is being carried out, desirably, a side sweep mixer provides supplemental mixing. When an in-line milling process is being carried out, desirably, conventional impeller stirring is employed in the mixing vessel.

Use of a simple stainless steel vessel with a high-speed mixer is desirable due to simplicity of design, low cost and ease of use. Preferred vessel geometries include diameter to depth ratios of about 1:1 to 1:10. Vessel volumes may range from less than 1 cc to over 4000 liters. The mixing vessel(s) used in the inventive process may optionally be fitted with baffles to facilitate agitation. A vessel cover may be used to prevent contamination in the milling chamber and/or allow for pressurization or vacuum. The process can be carried out within a wide range of temperatures and pressures. The process preferably is carried out at a temperature below that which can cause the compound to be milled to degrade, or which can cause the surface active agent (e.g., dispersant or particle stabilizer), if present, to degrade, or the liquid vehicle to vaporize significantly or even boil. For many substrates, ambient temperatures are appropriate. Temperatures of less than about 30° C. to 40° C. are typically preferred. The temperature of the media milling mixture is maintained below the melting point of the solid compound being milled during the process of this invention. Control of the temperature, e.g., by jacketing or immersion of the milling chamber in cold water, ice water, a heated or cooled air bath, a chilled glycolic solvent bath, a chilled oil bath, and by electrical resistance heating are contemplated. It is preferred that jacketed vessels be used to provide superior temperature control during milling. Processing pressures from about 1 psi up to about 50 psi are contemplated. Processing pressures from about 10 psi to about 30 psi are typical. Higher pressures may be used to prevent boiling.

The invention is directed at the efficient preparation of nanoparticulate dispersions, which herein refers to dispersions predominantly comprised of particles with equivalent sphere diameter of the volume distribution that are less than about 200 nm, preferably less than or equal to about 100 nm. Particle sizing methodology and techniques useful in measuring dispersion milling media properties are described in National Institute of Standards and Technology Special Publication No. 960-1, "Particle Size Characterization" (NIST, 2001). A variety of statistics can be used to describe the distribution of particle sizes comprising a dispersion. The volume-weighted equivalent sphere diameter average particle size is a measure of the central tendency of the distribution and represents the center of gravity of the volume based distribution, as 50% of the volume of the particle distribution will have an equivalent sphere diameter smaller than the volume-weighted average equivalent sphere diameter. In order to quantify the breadth or narrowness of the distribution, it can be further categorized into percentiles showing the percentage of the volume that is smaller or larger than a given interval or other point. Since many critical applications of the dispersion are sensitive to the relatively small numbers of the largest particles of the distribution, e.g., it is valuable to also consider the $90^{th}$ or $95^{th}$ percentiles; beyond the $95^{th}$ percentile, statistical uncertainty in sampling undermines the accuracy of the determination and the result is not reliable. The volume-weighted distribution is strongly influenced by the volume content of the largest particles comprising the distribution, so it is a useful metric. It is desirable that the average volume diameter of the volume distribution is less than about 200 nm, and more preferably less than or equal to about 100 nm and even less than or equal to about 60 nm, and that the $95^{th}$ percentile of the volume distribution is less than about 250 nm, more preferably less than about 175 nm, and most preferably less than about 125 nm; it is desirable to achieve these final dispersion particle size distributions within 24 hours of milling. It is convenient to continuously monitor dispersion particle size with an on-line spectroscopic technique rather than by withdrawing and preparing samples for individual instrumental analysis, as disclosed in U.S. Pat. No. 6,600,559 B2 to Switalski et al., the disclosure of which is herein incorporated by reference.

The relative tip speed of the rotor element in relation to the stator element for a given separation distance determines the magnitude of the shearing action and cavitation if present that produce the media-compound collisions responsible for particle size reduction. Thus it is desirable to operate the milling process with sufficient rotor tip speed to achieve productive particle size reduction without overloading the rotor-stator mixer's motor or producing unacceptable heating of the milling mixture. Desirably, the milling process has stably achieved its target particle size distribution after about 24 hours, and more desirably within 12 hours. Useful tip speeds at the low volume ratios of wetted milling media-to-dispersion exceed about 25 meters per second. In preferred embodiments of the invention, the tip speed is at least 33 meters per second, more preferably at least about 45 meters per second.

The selection of milling media properties influences many features of the milling process, including the final dispersion particle size distribution and the potential for contamination of the dispersion by milling attrition by-products. The invention can be practiced with a wide variety of milling media, including both inorganic and organic media. Media compositions may include sand, glass, ceramics, steels, silicon carbide, ceramics, cerium oxide, zirconium silicate, zirconium oxide, zirconium and yttrium oxide (such as 95% zirconium oxide stabilized with magnesia, or 95% zirconium oxide stabilized with yttrium), and silicon nitride, for durability and heat transfer properties. When hard and dense ceramic media such yttrium-stabilized zirconium oxide (YTZ) or zirconium oxide media are used, it is preferred to use rotor-stator elements that are fabricated from urethane polymeric resin or PEEK polymeric resin for aqueous milling applications, or which are fabricated from tungsten carbide or YTZ for organic solvent milling applications, in order to avoid attrition of the rotor and stator elements. In a preferred embodiment, the milling material can comprise particles, preferably substantially spherical in shape, e.g., beads, consisting essentially of a polymeric resin. Polymer media is inert and less prone to wear than metallic and ceramic media. In another embodiment, milling media in the form of non-spherical shapes are expected to be useful in the practice of this invention. Such shapes include cylindrical and torroidal shapes. Composites of inorganic media covered with cross-linked organic polymers are also useful. Polymeric resin media are preferred due to low density and good chemical and physical stability. In general, polymeric resins suitable for use herein are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as polymethyl methylacrylate, polycarbonates, polyacetals, such as Delrin™, vinyl chloride polymers and copolymers, polyurethanes, polyamides, poly(tetrafluoroethylenes), e.g., Teflon™, and other fluoropolymers, high density polyethylenes, polypropylenes, cellulose ethers and esters such as cellulose acetate, polyhydroxymethacrylate, polyhydroxyethyl acrylate, silicone containing polymers such as polysiloxanes and the like. The polymer can be biodegradable. Exemplary biodegradable polymers include poly(lactides), poly(glycolids) copolymers of lactides and glycolide, polyanhydrides, poly(hydroxyethyl methacrylate), poly(imino carbonates), poly(N-acylhydroxyproline) esters, poly(N-palmitoyl hydroxyprolino)esters, ethylene-vinyl acetate copolymers, poly(orthoesters), poly(caprolactones), and poly(phosphazenes). The polymeric resins generally have a density from 0.9 to 3.0 g/cc. Higher density resins are preferred inasmuch as it is believed that these provide more efficient particle size reduction. Useful polymeric resin milling media types are disclosed in U.S. Pat. No. 5,478,705 to Czekai et al., the disclosure of which is herein incorporated by reference.

The media can range up to about 300 microns in average particle size. For fine milling, the particles preferably are less than about 200 microns in average particle size, more preferably less than about 100 microns, and even more preferably less than about 75 microns in size, and most preferably less than or equal to about 50 microns in average particle size, as such smaller media provides high milling efficiency and enables preparation of minimal milled compound particle size. Larger media has more momentum due to their mass, but smaller media experiences more collisions. During the milling process, each bead-to-bead collision applies stress to the particle. Excellent particle size reduction has been achieved with media having a particle size of about 25 microns, and media milling with media having a particle size of 5 microns or less is contemplated. It is contemplated to employ a plurality of media sizes as disclosed in U.S. Pat. No. 6,604,698 B2 to Verhoff at al., the complete disclosure of which is herein incorporated by reference.

The milling chamber of the rotor-stator mixing unit is preferably not constrained with a separation screen in near proximity which would prevent free circulation of the milling media in the milling mixture throughout the process vessel containing the mixture (as may be accomplished with conventional immersion mills or horizontal media mills which retain the milling media in a basket or chamber). The preferred small milling media bead sizes employed in the method of the invention generally prohibit the effective use of separator screen enclosures during milling due to hydraulic packing of the media and plugging, blocking the flow of dispersion into the basket and fresh mixture into the milling chamber. The inability to efficiently separate the media from the dispersion is exasperated with the use of lower density polymer media due to the reduction in centrifugal force. Instead, the separation of the dispersion from the milling media is preferably accomplished after the completion of particle size reduction. The use of vacuum filtration through a removable filter probe immersed in the milling mixture as described in U.S. Pat. No. 5,662,279 is especially suitable. In preferred embodiments of the invention, an in-line centrifuge may be used to separate the media from the dispersion; the preferred method for centrifuge separation is the in-line rotor-stator configuration. Alternative approaches for removing the dispersion from the media include the use of a pressure vessel with a separator screen on the bottom of the tank.

The compound to be milled using this invention can comprise any crystalline or amorphous solid material that can be milled in a media mill. Generally the compound is a solid that may be a single crystalline form, a mixture of crystalline forms, an amorphous solid, or a mixture of solids to be milled. The size of at least some of the components of the solid is generally larger than the size of very small particles produced in this invention, although the compound may contain a range of sizes including some very small particles that can form a dispersion in the fluid vehicle or carrier. The compounds can be organic solids, either crystalline or amorphous materials, or they may be inorganic solids as long as they can be reduced in size by the milling process. Organic solids can be single compounds or mixtures of compounds, enantiomers, optical isomers, racemic mixtures, diastereomers, structural isomers, blends, glasses, separate crystal forms of a single substance or can be comprised of a plurality of polymorphs, eutectic mixtures, or formulations of different compounds such as a pigmented colorant and a surface active substance. The compound may be comprised of a precipitated solid, a recrystallized solid, a partially milled solid such as a previously media-milled solid, a jet milled solid, a partially ground solid, a micronized solid, a pulverized solid, a ball milled solid, a triturated solid, a sublimed solid, a residue from an evaporation, a solid derived from a synthetic process, a solid derived from an extract such as an organic solvent extraction or supercritical fluid extraction from a mixture such as a reaction product, or plant or tissue extract. The solid is preferably essentially water-insoluble or completely water-insoluble when water is the milling vehicle or carrier medium.

Examples of solid material that can be milled according to the methods of this invention include solid colorants such as pigments for inkjet printing; high-transparency colorants for electronic display color filter arrays, solid photographic materials such as dyes; solid cosmetic ingredients; solid chemicals; solid metal powders; solid catalyst materials; solid support material for catalysts; solid stationary phase particles or support materials useful in analytical and preparative chromatography; solid toner materials such as black toner materials and colored toner materials that are useful in xerographic and printing applications including laser printing; and solid pharmaceutical agents including water-soluble, water-insoluble, essentially water-insoluble and poorly water-soluble therapeutic and diagnostic imaging agents, medicinally active agents, medicaments, plant and herbal extracts, drugs, pro-drugs, drug formulations, diagnostic imaging agents, and the like.

The invention is useful for aqueous and non-aqueous (organic solvent-based) dispersion processes. The invention is especially suitable for dispersing pigmented colorants for preparing inkjet ink compositions. Preferred colorants and molecular dispersants are described in U.S. Pat. No. 5,679,139 issued to McInerney et al., and U.S. Pat. No. 5,738,716 to Santilli et al., the disclosures of which are herein incorporated by reference. The invention is also highly suitable for dispersing pigmented colorants for inkjet ink compositions in the presence of such preferred amphiphilic polymeric dispersants as described in U.S. Patent Application Nos. 2006/0012654 A1 to Wang et al.; 2006/0014855 A1 to House et al.; 2006/0043144 A1 to House et al.; and 2006/0043146 A1 to House et al., the complete disclosures of which are herein incorporated by reference. Examples of suitable non-aqueous pigmented inkjet colorant dispersion compositions are disclosed in U.S. Pat. No. 6,166,105 issued to Santilli et al. Particularly desirable solvent-based compounds suitable for the dispersion process of the invention include calcium oxide desiccant for organic light emitting diode (OLED) and other electronic devices; aluminum oxide for microelectronic chemical/mechanical polishing (CMP); and high-transparency pigmented colorants for electronic display color filter arrays. Examples of suitable non-aqueous pigmented color filter colorant dispersion compositions are disclosed in U.S. Pat. No. 7,166,394 issued to Yamagata et al.

EXAMPLES

The following examples are intended to illustrate the process of this invention in further detail, and not to limit it. The suffix (c) designates control or comparative milling processes, while the suffix (e) indicates example milling processes.

Example 1

Milling of Carbon Black Pigment Using Polymeric Dispersant

High Shear Impeller Mixer Process Example 1.1

To a 2.5-gallon, 9-inch diameter and 12-inch deep, double-walled stainless steel mixing vessel containing four baffles was added water (1,176 g) and a solution of alkanolamine-neutralized dispersant copolymer prepared from benzyl methacrylate, stearyl methacrylate, and methacrylic acid and having an average molecular weight $M_w$ of about 9,100 Daltons (824 g of a 18.2 wt % solution). A nominal 4-inch, ring-style disperser impeller (Hockmeyer Equipment Corp. D-Blade) driven by a Charles Ross & Son Co. Model HSM-100LH-2 High Shear Mixer was centered 2 inches above the bottom of the mixing vessel, and stirring was initiated. Degussa GmbH. NIPex® 180 IQ carbon black pigment (500 g) was slowly integrated into the fluid. Milling media comprising beads of polystyrene resin (copolymer of styrene and divinylbenzene/ethylvinylbenzene mixture) with an average particle diameter of 50 micrometers (3,000 g) was added slowly while increasing impeller speed. The mixture was milled with an impeller blade tip speed of ca. 19 m/sec for about 20 h at an internal temperature of 25-35° C. Samples were periodically removed, diluted and filtered for particle size determination by a Microtrac, Inc., Nanotrac® 150 dynamic light scattering analyzer. When milling was complete, the dispersion/media milling mixture was further diluted with water (2,475 g) containing Rohm and Haas Co. Kordek™ MLX preservative (25 g) to a final pigment concentration of about 10% and theoretical dispersion batch size of 5000 g. The impeller was removed from the dispersion/media milling mixture, and a vacuum separator filter probe was immersed. The filter probe consisted of 0.25-inch ID Tygon® plastic tubing connected to a sealed 2-inch length of 1.25-inch OD tubular, 38-micrometer screen (Johnson Screens, Inc.). A peristaltic pump was used to separate the dispersion from the milling media and it was subsequently filtered through a 0.3-micrometer removal efficiency Pall Corp. Profile II® depth filter. Roughly 4 kg of dispersion was recovered, approximately 80% yield. Processing parameters, relative batch size, and resultant volume-weighted particle size distribution statistics are recorded in Table 1.

High Shear Impeller Mixer Process Example 1.2

Using a procedure analogous to Process Example 1.1 above, NIPex 180 IQ carbon black pigment (675 g) was dispersed in a solution of water (1,588 g) and the same alkanolamine-neutralized dispersant copolymer (1,112 g of a 18.2 wt % solution) using the 50-micrometer average diameter polymeric resin milling media (1,688 g) over 20 h. Following milling, the dispersion/media milling mixture was diluted with a solution of Kordek MLX (33.8 g) in water (3,341 g) to a final pigment concentration of about 10% and theoretical dispersion batch size of 6,750 g. The dispersion was separated from the milling media and it was subsequently filtered through a 0.3-micrometer effective pore diameter depth filter. Processing parameters, relative batch size, and resultant particle size distribution statistics are recorded in Table 1.

High Shear Impeller Mixer Process Example 1.3

Using a procedure analogous to Process Example 1.2 above, NIPex 180 IQ carbon black pigment (675 g) was dispersed in a solution of water (1,588 g) and the same alkanolamine-neutralized dispersant copolymer (1,112 g of a 18.2 wt % solution) using 500-micrometer average diameter polymeric milling media (1,688 g) over 20 h. Following milling, the dispersion/media milling mixture was diluted with a solution of Kordek MLX (33.8 g) in water (3,341 g) to a final pigment concentration of about 10% and theoretical dispersion batch size of 6,750 g. The dispersion was separated from the milling media and it was subsequently filtered through a 0.3-micrometer effective pore diameter depth filter. Processing parameters, relative batch size, and resultant particle size distribution statistics are recorded in Table 1.

High Shear Impeller Mixer Process Example 1.4

Using a procedure analogous to Process Example 1.2 above, NIPex 180 IQ carbon black pigment (911 g) was dispersed in a solution of water (1146 g) and the same alkanolamine-neutralized dispersant copolymer (1,518 g of a 18.2 wt % solution) using 50-micrometer average diameter polymeric milling media (1,688 g) over 20 h. Following milling, the dispersion/media milling mixture was diluted with a solution of Kordek MLX (33.7 g) in water (3,139 g) to a final pigment concentration of 13.5% and theoretical dispersion batch size of 6,750 g. The dispersion was separated from the milling media and it was subsequently filtered through a 0.3-micrometer removal efficiency depth filter. Processing parameters, relative batch size, and resultant particle size distribution statistics are recorded in Table 1.

Rotor-Stator Process Example 1.5

To a 6.5-inch diameter and 7.5-inch deep, double-walled stainless steel mixing vessel was added water (884 g) and a solution of alkanolamine-neutralized dispersant copolymer prepared from benzyl methacrylate, stearyl methacrylate, and methacrylic acid and having an average molecular weight $M_w$ of about 8,300 Daltons (556 g of a 19.44 wt % solution). The dispersion head of a KADY® LT2000 Rotor-Stator High Speed Dispersion Lab Mill (Kady International) was centered 1.5 inches above the bottom of the mixing vessel, and stirring at about 4,000 rpm shaft speed was initiated. The dispersion head comprised concentric slotted cylindrical rotor and stator elements fabricated from stainless steel. The rotor diameter was 2.0 in, and the stator diameter was 2.75 in. The gap separating the rotor and stator elements was 0.43 mm; the width of the slots was 0.125 in. NIPex 180 IQ carbon black pigment (360 g) was added to the aqueous solution over a 20-minute period and the shaft speed was increased to about 13,500 rpm (50 Hz drive frequency). The mixture was milled with a rotor tip speed of ca. 37 m/sec for about 7 h at an internal temperature of 25-35° C. Samples were periodically removed, diluted and filtered for particle size determination by a Microtrac, Inc., UPA 150 Ultrafine Particle Analyzer dynamic light scattering method analyzer. Processing parameters, relative batch size, and resultant particle size distribution statistics are recorded in Table 1. Milling was terminated when it was apparent that further particle size reduction was not being achieved.

Rotor-Stator Process Example 1.6

In the same mixing vessel as in Process Example 1.5 above, NIPex 180 IQ carbon black pigment (360 g) was suspended in a solution of water (884 g) and the same alkanolamine-neutralized dispersant copolymer (556 g of a 19.44 wt % solution) using a Hockmeyer Equipment Corp. Model 3-HLI Lab Disperser. The disperser was removed, and the dispersion head of a KADY LT2000 Rotor-Stator High Speed Dispersion Lab Mill was centered about 1.5 inches above the bottom of the mixing vessel and stirring was initiated at 4,000 rpm shaft speed. The dispersion head comprised concentric slotted cylindrical rotor and stator elements fabricated from stainless steel. The rotor diameter was 2.0 in, and the stator diameter was 2.75 in. The gap separating the rotor and stator elements was 0.43 mm; the width of the slots was 0.125 in. 50-micrometer average diameter polystyrene polymeric resin milling media (1,000 g) was integrated into the mixture by stirring at about 4,000 rpm. The shaft speed was increased to about 13,500 rpm (50 Hz drive frequency). The mixture was milled with a rotor tip speed of ca. 37 m/sec for about 7 h at an internal temperature of 25-35° C. Samples were periodically removed, diluted and filtered for particle size determination by a Microtrac, Inc., UPA 150 Ultrafine Particle Analyzer.

Milling was terminated when it was apparent that further particle size reduction was not being achieved. The dispersion/media milling mixture was transferred to a larger vessel and diluted to about 10-wt % pigment by the addition of water (1,800 g). The diluted mixture was stirred for 30 minutes, and a vacuum separator filter probe was immersed. The filter probe consisted of Tygon plastic tubing connected to a sealed length of tubular 38-micrometer screen (Johnson Screens, Inc.). A peristaltic pump was used to separate the dispersion from the milling media and it was subsequently filtered through a 0.3-micrometer removal efficiency Pall Corp. Profile II depth filter. Approximately 98% of the dispersion was recovered in the separation process. Processing parameters, relative batch size, and resultant particle size distribution statistics are recorded in Table 1.

Rotor-Stator Process Example 1.7

Using a procedure analogous to Process Example 1.6 above, NIPex 180 IQ carbon black pigment (360 g) was suspended in a solution of water (884 g) and the same alkanolamine-neutralized dispersant copolymer (556 g of a 19.44 wt % solution) and ten dispersed using the 50-micrometer average diameter polymeric resin milling media (360 g) by the KADY LT2000 rotor-stator mill over 20 hrs. The gap separating the rotor and stator elements of the dispersion head was 0.43 mm. Following milling, the dispersion/media milling mixture was transferred to a larger vessel and diluted to about 10 wt % of pigment by the addition of water (1,800 g). The dispersion was separated from the milling media and it was subsequently filtered through a 0.3-micrometer diameter removal efficiency depth filter. Processing parameters, relative batch size, and resultant particle size distribution statistics are recorded in Table 1.

In a separate experiment, a 20-wt % suspension of NIPex 180 IQ carbon black pigment in water containing the polymeric dispersant of Process Example 1.1, at the stated weight proportion, was prepared by combining the dispersion ingredients in a 5-L mixing vessel with good stirring using the ring-style disperser. The density of the dispersion was determined to be 1.06 g/cc by measuring the mass of this suspension that occupied 100 cubic centimeters at ambient temperature using a graduated cylinder. The absolute density of the dry 0.050 mm average diameter polystyrene resin milling media was determined to be 1.089 g/cc with a Micromeritics Multivolume Pycnometer 1305 using helium gas displacement methodology; this determination excluded the volume contribution of the void spaces between the beads that would otherwise be filled with air if the apparent density were determined directly, as with the pigment dispersion. In Table 1, volume ratios of milling media to the 20 wt-% pigment dispersion (comprised of liquid media and solid compound) were determined by using the reported density values to calculate the volumes of the milling media and the volumes of the dispersion from the weights of each that were used to produce the milling mixtures in each example, and then calculating the ratios.

Referring to Table 1, comparative examples 1.1a-1.1c illustrate the rate of conventional micromedia milling using preferred process parameters, including milling media-to-dispersion proportions of about 1.2 by volume (or coincidentally by weight), and ring-style disperser blade tip speeds of almost 20 m/s. After about 8 h (example 1.1b), the carbon black pigment milling process is largely complete; continued milling may perhaps make minor further reductions in particle size distribution, which is difficult to ascertain over random measurement variability in particle size determination. When it is attempted to increase the process yield by reducing the dry media-to-dispersion volume or weight ratios so that the batch mix contains more pigment dispersion (examples 1.2 (c) and 1.4 (c)), it proves impossible to achieve the same particle size distribution. Increasing the milling media bead size (example 1.3 (c)) worsens the effectiveness of the milling process at reduced media loading. When a high-speed rotor-stator milling configuration is employed without milling media to disperse the carbon black pigment at high tip speed in the conventional manner (example 1.5 (c)), the milling process does not progress to produce usable particle sizes. When polymeric resin milling micromedia are added at a media-to-dispersion volume ratio (and coincidentally weight ratio) of at least about 0.2 to about 0.5 (examples 1.6a-b (e) and 1.7 (e)), the milling process achieves optimum particle size distributions within about 24 hours, with increased dispersion quantity per batch. In addition, the dispersion separation time is reduced at the lower dry media/dispersion ratios of the examples and the total dispersion recovery is improved over the normal high-shear mixer milling process.

Example 2

Milling of Crystalline Yellow Pigment Using Polymeric Dispersant

High Shear Impeller Mixer Process Example 2.1

To a 2.5-gallon, 9-inch diameter and 12-inch deep, double-walled stainless steel mixing vessel was added water (1,200 g) and a solution of potassium-neutralized dispersant copolymer prepared from benzyl methacrylate, stearyl methacrylate, and methacrylic acid (1200 g of a 19 wt % solution). A nominal 4-inch, ring-style disperser impeller (Hockmeyer Equipment Corp. D-Blade) driven by a Charles Ross & Son Co. Model HSM-100LH-2 High Shear Mixer was centered 2 inches above the bottom of the mixing vessel, and stirring was initiated. Sun Chemical Pigment Yellow 74 product code 272-5147 pigment (600 g) was slowly integrated into the fluid. Milling media comprising beads of polystyrene resin (copolymer of styrene and divinylbenzene/ethylvinylbenzene mixture) with an average particle diameter of 50 micrometers (3,000 g) was added slowly while increasing impeller speed. The mixture was milled with an impeller blade tip speed of ca. 19 m/sec for about 20 h at an internal temperature of 25-35° C. Samples were periodically removed, diluted and filtered for particle size determination by a dynamic light scattering method analyzer. When milling was complete, the dispersion/media mixture was further diluted with water (2,968 g) containing Kordek MLX preservative (32 g) to a final pigment concentration of about 10 wt % and a theoretical dispersion batch size of 6000 g. The impeller was removed from the dispersion/media mixture, and a vacuum separator filter probe was immersed. The filter probe consisted of 0.25-inch ID Tygon plastic tubing connected to a sealed 2-inch length of 1.25-inch OD tubular, 38-micrometer screen. A peristaltic pump was used to separate the dispersion from the milling media and it was subsequently filtered. Processing parameters and the resultant particle size distribution statistics are recorded in Table 2.

High Shear Impeller Mixer Process Example 2.2

Using a procedure analogous to Process Example 2.1 above, Sun Chemical Pigment Yellow 74 product code 272-5147 pigment (300 g) was dispersed in a solution of water (600 g) and the same potassium-neutralized dispersant copolymer (600 g of a 19 wt % solution) using the 50-micrometer average diameter polymeric resin milling media (825 g) over 24 h in a 1-gallon, 7-inch diameter and 9-inch deep, double-walled stainless steel mixing vessel with a 3-inch diameter ring-style disperser impeller. Following milling, the dispersion/media milling mixture was diluted with a solution of Kordek MLX (16 g) in water (1484 g) to a final pigment concentration of 10% and theoretical dispersion batch size of 3000 g. The dispersion was separated from the milling media and it was subsequently filtered. Processing parameters and the resultant particle size distribution statistics are recorded in Table 2.

Rotor-Stator Process Example 2.3

To a 6.5-inch diameter and 7.5-inch deep, double-walled stainless steel mixing vessel was added water (880 g) and a solution of potassium-neutralized dispersant copolymer prepared from benzyl methacrylate, stearyl methacrylate, and methacrylic acid (880 g of a 19 wt % solution). The dispersion head of a KADY LT2000 Rotor-Stator High Speed Dispersion Lab Mill was centered 1.5 inches above the bottom of the mixing vessel, and stirring at about 4,000 rpm shaft speed was initiated. The rotor diameter was 2.0 in, and the stator diameter was 2.75 in. The gap separating the rotor and stator elements of the dispersion head was 0.43 mm; the width of the slots was 0.125 in. Sun Chemical Pigment Yellow 74 product code 272-5147 pigment (440 g) was added to the aqueous solution over a 20-minute period and shaft speed was increased to about 16,000 rpm (60 Hz drive frequency). The mixture was milled with a rotor tip speed of ca. 45 m/sec for about 7 h at an internal temperature of 25-35° C. Samples were periodically removed, diluted and filtered for particle size determination by a dynamic light scattering method analyzer. Processing parameters and resultant particle size distribution statistics are recorded in Table 2. Milling was terminated when it was apparent that further particle size reduction was not being achieved.

Rotor-Stator Process Example 2.4

In the same mixing vessel as in Process Example 3 above, Sun Chemical Pigment Yellow 74 product code 272-5147 pigment (440 g) was suspended in a solution of water (880 g) and the potassium-neutralized dispersant copolymer (880 g of a 19-wt % solution) using a Hockmeyer Equipment Corp. Model 3-HLI Lab Disperser. The disperser was removed, and the dispersion head of a Kady International LT2000 Rotor-Stator High Speed Dispersion Lab Mill was centered 1.5 inches above the bottom of the mixing vessel and stirring was initiated at about 4,000 rpm shaft speed. Polystyrene resin milling media with average diameter of about 200-micrometer (1,210 g) was integrated into the mixture by stirring at about 4,000 rpm. The shaft speed was increased to about 16,000 rpm (60 Hz drive frequency). The mixture was milled with a rotor tip speed of ca. 45 m/sec for about 15 h at an internal temperature of 25-40° C. Samples were periodically removed, diluted and filtered for particle size determination by a dynamic light scattering method analyzer. Processing parameters, relative batch size, and resultant particle size distribution statistics are recorded in Table 2. Milling was terminated when it was apparent that further particle size reduction was not being achieved. Processing parameters and resultant particle size distribution statistics are recorded in Table 2.

Rotor-Stator Process Example 2.5

In a 5-L, 7-inch diameter and 8-inch deep, double-walled stainless steel mixing vessel, Sun Chemical Pigment Yellow 74 product code 272-5147 pigment (360 g) was suspended in a solution of water (720 g) and the potassium-neutralized dispersant copolymer (720 g of a 19 wt % solution) using a Hockmeyer Equipment Corp. Model 3-HLI Lab Disperser. The disperser was removed, and the dispersion head of a KADY LT2000 Rotor-Stator High Speed Dispersion Lab Mill was centered 1.5 inches above the bottom of the mixing vessel; stirring was initiated at about 4,000 rpm shaft speed. The rotor diameter was 2.0 in, and the stator diameter was 2.75 in. The gap separating the rotor and stator elements of the dispersion head was 0.43 mm; the width of the slots was 0.125 in. Polystyrene resin milling media with average diameter of about 50-micrometer (990 g) was integrated into the mixture by stirring at about 4,000 rpm. The shaft speed was increased to about 16,000 rpm (60 Hz drive frequency). The mixture was milled with a rotor tip speed of ca. 45 m/sec for about 7 h at an internal temperature of 30-40° C. Samples were periodically removed, diluted and filtered for particle size determination using a dynamic light scattering method analyzer. Milling was terminated when it was apparent that further particle size reduction was not being achieved. The dispersion/media mixture was transferred to a larger vessel and was diluted with a solution of Kordek MLX (19 g) in water (1781 g) to a final pigment concentration of about 10% and theoretical dispersion batch size of 3600 g. The diluted mixture was stirred for 30 minutes, and a vacuum separator filter probe was immersed. The filter probe consisted of Tygon plastic tubing connected to a sealed length of tubular 38-micrometer screen (Johnson Screens, Inc.). A peristaltic pump was used to separate the dispersion from the milling media and it was subsequently filtered through a 0.3-micrometer removal efficiency Pall Corp. Profile II depth filter followed by a 0.45-micrometer removal efficiency Pall Corp. Ultipor GF Plush filter. Roughly 3.5 kg of dispersion was recovered, approximately 95% yield. Processing parameters and the resultant particle size distribution statistics are recorded in Table 2.

As can be seen from Table 2, reduction of the dry milling media/dispersion weight ratio from a typical value of 1.1 (example 2.1 (c)) to 0.55 (example 2.2 (c)) significantly broadens the final dispersion particle size distribution from the milling of the crystalline organic yellow pigment. A rotor-stator mixer operating at high tip speed without milling media is unable to grind the yellow pigment to nanometer particle size domains (example 2.3 (c)). Using a rotor-stator mixer at a low dry media/dispersion ratio with 200-micron polymeric milling media results in improved particle size reduction (example 2.4 (c)). When 50-micron milling media are used at the same low media/dispersion ratio, highly efficient milling resulting in the normal final particle size distribution is achieved with the rotor-stator mixer (example 2.5 (e)). In addition, the dispersion/media separation time was reduced at the lower dry media/dispersion ratio of the example (example 2.5 (e)), and the total dispersion recovery was improved over the normal high shear mixer milling (example 2.1 (c)).

Example 3

Milling of Crystalline Yellow Pigment Using Molecular Dispersant

Rotor-Stator Process Example 3.1

In a 5-L, 7-inch diameter and 8-inch deep, double-walled stainless steel mixing vessel, Clarient GmbH. Pigment Yellow 155 pigment (360 g) was suspended in a solution of water (840 g) and a solution of OMT (Oleoylmethyltaurine, potassium salt) (600 g of a 15 wt % solution) using a Hockmeyer Equipment Corp. Model 3-HLI Lab Disperser. The disperser was removed, and the dispersion head of a KADY LT2000 Rotor-Stator High Speed Dispersion Lab Mill was centered 1.5 inches above the bottom of the mixing vessel; stirring was initiated at about 4,000 rpm shaft speed. The rotor diameter was 2.0 in, and the stator diameter was 2.75 in. The gap separating the rotor and stator elements of the dispersion head was 0.43 mm; the width of the slots was 0.125 in. Polystyrene resin milling media with average diameter of about 50-micrometer (990 g) was integrated into the mixture by stirring at about 4,000 rpm. The shaft speed was increased to about 16,000 rpm (60 Hz drive frequency). The mixture was milled with a rotor tip speed of ca. 45 m/sec for about 7 h at an internal temperature of 25-40° C. Samples were periodically removed, diluted and filtered for particle size determination by a dynamic light scattering method analyzer. Milling was terminated when it was apparent that further particle size reduction was not being achieved. The dispersion/media milling mixture was transferred to a larger vessel and was diluted with a solution of Kordek MLX (19 g) in water (1781 g) to a final pigment concentration of about 10% and theoretical dispersion batch size of 3600 g. The diluted mixture was stirred for 30 minutes, and a vacuum separator filter probe was immersed. The filter probe consisted of Tygon plastic tubing connected to a sealed length of tubular 38-micrometer screen. A peristaltic pump was used to separate the dispersion from the milling media and it was subsequently filtered through a 0.3-micrometer removal efficiency Profile II depth filter followed by a 0.45-micrometer removal efficiency Ultipor GF Plus filter. Roughly 3.5 kg of dispersion was recovered, approximately 95% yield. Processing parameters and the resultant particle size distribution statistics are recorded in Table 3.

As can be seen from Table 3, when 50-micron milling media are used at a low dry media/dispersion weight ratio with a rotor-stator mixer operating at a high tip speed of about 45 m/s, highly efficient milling rapidly results in a nanoparticulate final particle size distribution with a crystalline organic pigment stabilized with a small molecule dispersant (example 3.1c (e)).

Example 4

Milling of Pigment Using Colloid Mill

A mixture was prepared by dispersing a pigment (60 grams) as identified in Table 4 in an aqueous solution (440 grams) containing about 4.1 wt % of a copolymer of benzyl methacrylate, stearyl methacrylate, and methacrylic acid having a composition of 37/30/33 by weight, a molecular weight of about 9000, and a degree of neutralization of about 90%. Polystyrene resin milling media with average diameter of about 50-micrometer (250 g) was integrated into the mixture by stirring at about 200 rpm. The combined pigment/milling media slurry was then passed through a Gaulin Colloid Mill Model 4D (Manton-Gaulin Manufacturing Co.) 20 times. The colloid mill comprised an in-line rotor-stator having an approximately 3-inch diameter rotor cone operating at a tip speed of about 80 m/s mated against a solid stator surface, with a rotor-stator gap of 4 to 5 mils (approximately 0.1 mm). The dwell time for each pass through the colloid mill was about 10 seconds. The resultant slurry was then diluted by adding 100 grams of deionized water and filtered through a 5-micron filter to remove the milling media. Processing parameters and particle sizes are recorded in the following Table 4.

As can be seen from Table 4, a low dry media/dispersion weight ratio may also be used in a colloid mill type in-line rotor-stator mixer operating at a high tip speed to achieve highly efficient milling and a desired nanoparticulate final particle size distribution.

The invention has been described in detail with particular reference to preferred embodiments thereof, but it is to be understood that variations and modifications can be effected within the spirit and scope of the invention.

TABLE 1

(Carbon Black Pigment)

| Entry | Mill Type | Dispersion Pigment Concentration (%) | Weight Ratio of Dry Media to Dispersion in Milling Mixture | Volume Ratio of Dry Media to Dispersion in Milling Mixture | Relative Batch Size (%) | Media Size (mm) | Blade Tip Speed (m/s) | Milling Time (h) | Volume-weighted Particle Size 50th Percentile (nm) | 95th Percentile (nm) |
|---|---|---|---|---|---|---|---|---|---|---|
| 1.1a (c) | HSD | 20 | 1.20 | 1.2 | 100 | 0.050 | 19 | 5 | 62 | 110 |
| 1.1b (c) | HSD | 20 | 1.20 | 1.2 | 100 | 0.050 | 19 | 8 | 61 | 104 |
| 1.1c (c) | HSD | 20 | 1.20 | 1.2 | 100 | 0.050 | 19 | 21 | 57 | 99 |
| 1.2 (c) | HSD | 20 | 0.50 | 0.5 | 135 | 0.050 | 20 | 20 | 70 | 122 |
| 1.3 (c) | HSD | 20 | 0.50 | 0.5 | 135 | 0.500 | 20 | 20 | 89 | 165 |
| 1.4 (c) | HSD | 27 | 0.50 | <1 | 180 | 0.050 | 20 | 22 | 74 | 122 |
| 1.5 (c) | Rotor-Stator | 20 | 0.00 | 0.0 | 220 | — | 37 | 7 | 131 | 220 |
| 1.6a (e) | Rotor-Stator | 20 | 0.56 | 0.5 | 142 | 0.050 | 45 | 5 | 63 | 105 |
| 1.6b (e) | Rotor-Stator | 20 | 0.56 | 0.5 | 142 | 0.050 | 45 | 8 | 60 | 101 |
| 1.7 (e) | Rotor-Stator | 20 | 0.20 | 0.2 | 183 | 0.050 | 45 | 20 | 66 | 109 |

TABLE 2

(Pigment Yellow 74)

| Entry | Mill Type | Dispersion Pigment Concentration (%) | Dry Media: Dispersion Weight Ratio | Volume Ratio of Dry Media to Dispersion in Milling Mixture | Media Size (mm) | Blade Tip Speed (m/s) | Milling Time (h) | Volume-weighted Particle Size 50th Percentile (nm) | 95th Percentile (nm) |
|---|---|---|---|---|---|---|---|---|---|
| 2.1 (c) | HSD | 20 | 1.10 | >1 | 0.050 | 19 | 20 | 12 | 19 |
| 2.2 (c) | HSD | 20 | 0.55 | <1 | 0.050 | 19 | 28 | 14 | 63 |
| 2.3 (c) | Rotor-Stator | 20 | 0.00 | <1 | — | 45 | 7 | 260 | 1110 |
| 2.4 (e) | Rotor-Stator | 20 | 0.55 | <1 | 0.200 | 45 | 15 | 133 | 233 |
| 2.5 (e) | Rotor-Stator | 20 | 0.55 | <1 | 0.050 | 45 | 7 | 11 | 16 |

TABLE 3

(Pigment Yellow 155)

| Entry | Mill Type | Dispersion Pigment Concentration (%) | Dry Media: Dispersion Weight Ratio | Volume Ratio of Dry Media to Dispersion in Milling Mixture | Media Size (mm) | Rotor Tip Speed (m/s) | Milling Time (h) | Particle Size 50th Percentile (nm) | 95th Percentile (nm) |
|---|---|---|---|---|---|---|---|---|---|
| 3.1a (e) | Rotor-Stator | 20 | 0.55 | <1 | 0.050 | 45 | 3 | 17 | 95 |
| 3.1b (e) | Rotor-Stator | 20 | 0.55 | <1 | 0.050 | 45 | 5 | 15 | 73 |
| 3.1c (e) | Rotor-Stator | 20 | 0.55 | <1 | 0.050 | 45 | 7 | 14 | 58 |

TABLE 4

(Crystalline Organic Pigments)

| Entry | Mill Type | Pigment Type | Dry Media: Dispersion Weight Ratio | Volume Ratio of Dry Media to Dispersion in Milling Mixture | Media Size (mm) | Rotor Tip Speed (m/s) | Milling Turnovers (No. of Passes) | Particle Size 50th Percentile (nm) | 95th Percentile (nm) |
|---|---|---|---|---|---|---|---|---|---|
| 4.1 (c) | In-Line Rotor-Stator | Yellow PY 74 | 0 | 0 | — | 80 | 20 | 342 | 1152 |
| 4.2 (e) | In-Line Rotor-Stator | Yellow PY 74 | 0.5 | <1 | 0.05 | 80 | 20 | 11 | 105 |
| 4.3 (e) | In-Line Rotor-Stator | Magenta Ciba 2BC | 0.5 | <1 | 0.05 | 80 | 20 | 62 | 188 |
| 4.4 (e) | In-Line Rotor-Stator | Cyan PB 15:3 | 0.5 | <1 | 0.05 | 80 | 20 | 110 | 252 |

What is claimed is:

1. A process for forming a dispersion of milled solid particles of a compound comprising:

forming a milling mixture of a liquid medium, milling media having an average particle size of less than or equal to about 300 microns, and a solid compound in a mixing vessel, and agitating the milling mixture with a mixer to contact the milling media and solid compound and to reduce the solid compound to a desired average particle size to form a dispersion of milled solid particles in the liquid medium, wherein the volume ratio of the milling media to the combined volume of the liquid media and solid compound in the milling mixture is less than 1, a rotor-stator mixer comprising rotor and stator elements separated by a rotor-stator gap of greater than the average particle size of the milling media and not greater than about 2.5 mm is employed to agitate the milling mixture in a milling chamber of the rotor-stator mixer, and the solid compound is milled to a volume-weighted average equivalent sphere diameter particle size of less than or equal to about 200 nm.

2. The process of claim 1, wherein the milling media has an average particle size of less than or equal to about 100 microns.

3. The process of claim 2, wherein the milling media has an average particle size of less than or equal to about 50 microns.

4. The process of claim 2, wherein the rotor-stator gap separating the rotor and stator elements is not greater than about 1.0 mm.

5. The process of claim 2, wherein the rotor-stator gap separating the rotor and stator elements is not greater than about 0.5 mm.

6. The process of claim 1, wherein the rotor-stator is operated at a tip speed of at least about 33 m/s.

7. The process of claim 1, wherein the volume ratio of the milling media to the combined volume of the liquid media and solid compound in the milling mixture is less than 0.8.

8. The process of claim 1, wherein the volume ratio of the milling media to the combined volume of the liquid media and solid compound in the milling mixture is less than 0.6.

9. The process of claim 1, wherein the solid compound is present in the milling mixture at a concentration of at least about 15 wt % relative to the liquid media.

10. The process of claim 9, wherein the solid compound is present in the milling mixture at a concentration of from about 15 to about 40 wt % relative to the liquid media.

11. The process of claim 1, wherein the solid compound is milled to a volume-weighted average equivalent sphere diameter particle size of less than or equal to about 100 nm.

12. The process of claim 11, wherein the solid compound is milled to a 95th percentile volume distribution equivalent sphere diameter of less than or equal to about 175 nm.

13. The process of claim 1, wherein the solid compound is milled to a volume-weighted average equivalent sphere diameter particle size of less than or equal to about 100 nm and a 95th percentile volume distribution equivalent sphere diameter of less than or equal to about 175 nm in less than 24 hours.

14. The process of claim 1, wherein the solid compound is milled to a volume-weighted average equivalent sphere diameter particle size of less than or equal to about 60 nm.

15. The process of claim 1, wherein the milling media comprises polymeric resin beads.

16. The process of claim 1, wherein the solid compound comprises a pigmented colorant.

17. The process of claim 1, further comprising separating the dispersion of milled particles from the milling media by vacuum filtration through a filter probe immersed into the milling mixture after the solid compound is reduced to a desired particle size.

18. The process of claim 1, wherein the liquid medium of the milling mixture comprises a particle stabilizing dispersant or surfactant.

19. The process of claim 1, wherein the rotor-stator mixer is immersed in the milling mixture in the mixing vessel.

20. The process of claim 1, where the rotor-stator mixer comprises an in-line rotor-stator mixer, and wherein the milling mixture is passed through the in-line rotor-stator mixer.

* * * * *